United States Patent [19]

Oertle et al.

[11] Patent Number: 5,090,833
[45] Date of Patent: Feb. 25, 1992

[54] DEVICE FOR CONNECTING A MOTOR VEHICLE STEERING COLUMN TO A SHAFT JOURNAL OF A STEERING GEAR TRAIN

[75] Inventors: Max Oertle, Mauren; Stefan Miescher, Schaan, both of Liechtenstein

[73] Assignee: Etablissement Supervis

[21] Appl. No.: 664,040

[22] Filed: Mar. 4, 1991

[30] Foreign Application Priority Data

Mar. 3, 1990 [DE] Fed. Rep. of Germany ....... 4006787

[51] Int. Cl.⁵ ............................................. B65D 39/00
[52] U.S. Cl. ...................................... 403/12; 403/290; 403/373
[58] Field of Search .................... 403/373, 12, 290

[56] References Cited

U.S. PATENT DOCUMENTS 4,900,178 2/1990 Haldric et al. ............... 403/373 X

FOREIGN PATENT DOCUMENTS 2620997 3/1989 France .

Primary Examiner—Andrew V. Kundrat
Attorney, Agent, or Firm—Toren, McGeady & Associates

[57] ABSTRACT

A device for connecting a motor vehicle steering column to a shaft journal of a steering gear train includes a U-shaped coupling piece, the coupling piece is articulated to the steering column for pivotal movement about an axis extending transversely of a first direction of the coupling. The U-shaped coupling piece has a pair of laterally spaced sides connected together by an arch shaped bight section. The sides are spaced apart laterally transversely of the first direction. A lock bolt for retaining the shaft journal in the coupling is secured against turning in one of the sides and has a wedge-shaped surface facing into the space between the sides. The wedge-shaped surface has two bevel sections inclined inwardly into the space between the sides from diagonally opposite points on the outer circumferential periphery of the lock bolt.

15 Claims, 3 Drawing Sheets

DEVICE FOR CONNECTING A MOTOR VEHICLE STEERING COLUMN TO A SHAFT JOURNAL OF A STEERING GEAR TRAIN

BACKGROUND OF THE INVENTION

The invention is directed to a device for connecting a motor vehicle steering column to a shaft journal of a steering gear train and the device includes a U-shaped coupling piece. The coupling piece is arranged to be articulated to the steering column for pivotal movement about an axis. The U-shaped coupling piece has a pair of laterally spaced sides connected together by a bight section. A lock bolt is secured in a bore in at least one of the sides. A stop is formed by the side holding the lock bolt to limit its inward movement. A clamping bolt holds the shaft journal in its operative position. The bolt is pressed inwardly by a spring. A radially inner surface of the lock bolt has a wedge shaped beveled configuration.

A device of this type is disclosed in EU-OS 323 298. A clamping bolt locks the connection in position, and the lock bolt has an elongated threaded bore for receiving the thread of the clamping bolt. When the U-shaped coupling piece is pivoted on the shaft journal of the steering gear train, care must be taken to tighten the clamping bolt so that the shaft journal assumes its intended position between the sides and the bight section of the U-shaped coupling piece. Such assurance is not afforded by the device features alone. Moreover, a leaf spring is provided by a cross-shaped spring with the free ends of the arms of the spring having multiple folds. This cross-shaped three-dimensional leaf spring is placed from the outside on the coupling piece where it is retained due to the mentioned folds. Such an arrangement is not favorable. The spring is complicated to form, requiring special fabrication, and the arrangement of this leaf spring at the coupling piece is considered to be disadvantageous, since the spring can be easily lost, if it is not carefully installed even if an assist piece is used during assembly.

Another device of this type is set forth in FR-OS 2 620 997 where the clamping bolt is equipped with a ring stored in a bushing located outside the device. Initially, the ring is connected with the clamping bolt similar to the arrangement in a brake and is retained along with the bolt in the bushing, mentioned above, by a yielding bolt. After the gear train assembly is inserted, the clamping bolt is pressed against a nut with the holding force of the flexural or yielding bolt being overcome so that the ring along with the clamping bolt migrates against the nut. During subsequent threading-in of the bolt into the nut, the holding or retaining force of the braking ring is overcome, whereby the ring assumes a retaining position relative to the clamping bolt. While this known design can fulfil its intended task, it is relatively cumbersome and expensive, because of the large number of components required.

SUMMARY OF THE INVENTION

Therefore, it is the primary object of the present invention to improve upon the known arrangement for facilitating assembly such as for effecting automated assembly. Such automation can be used, since the arrangement of the parts of the connecting piece will assume functionally correct positions relative to one another. Furthermore, the device includes as few components as possible. Another feature of the invention is that the device can include a commercially available spring. In accordance with the present, the inwardly facing wedge-shaped beveled end surface of the lock bolt has two bevel sections inclined inwardly toward one another with the bevel sections facing toward the bight section of the coupling piece. The angle of inclination of the bevel sections is such that one is greater than the other.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
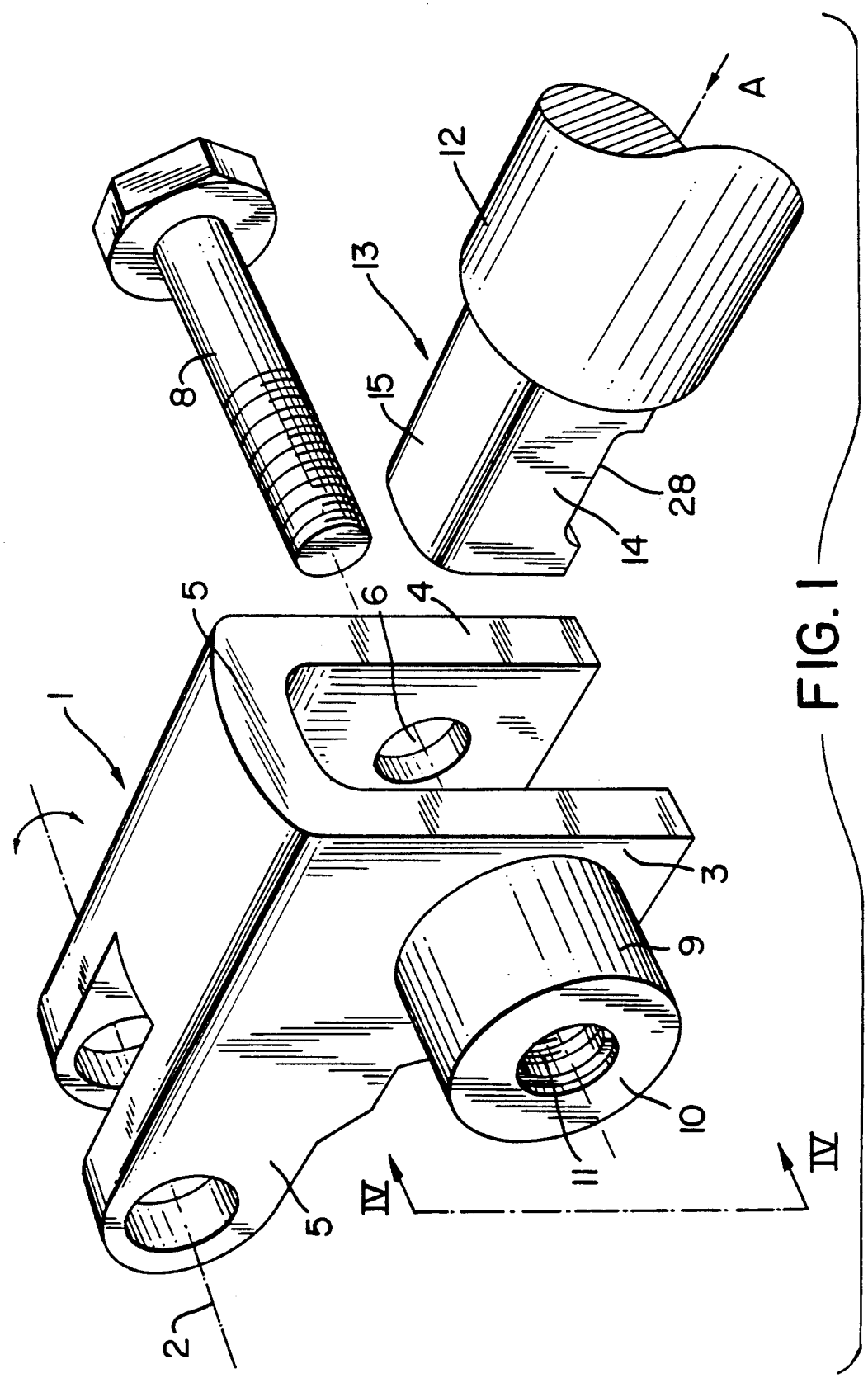
FIG. 1 is an exploded perspective view of the device of the present invention illustrating the parts of the device to be connected together.

FIG. 1 displays the essential elements of the device embodying the present invention in an exploded perspective view. The device includes a coupling piece 1, such as a part of a Cardan joint, to be articulated at the end of a steering column, not shown, with the coupling piece being pivotable about its transverse axis 2. The coupling piece 1 extends in a first direction identified by the arrow A with the axis 2 extending transversely of the first direction. Transverse of the first direction, coupling piece 1 has a U-shaped cross-section with laterally spaced sides 3, 4 and a web or bight section 5 interconnecting the sides. The bight section 5 has an arched or curved configuration. Bores 6 and 7 are aligned with one another and are provided in the sides 3, 4. In FIG. 1, however, only the bore 6 in the side 4 is shown. These bores serve for receiving a clamping bolt 8. Bore 7 in side 3 is blocked from view by a bushing 9 connected to and extending outwardly from the side 3. The outer end of the bushing 10 has a threaded bore 11 for receiving the threaded end of the clamping bolt 8. Coupling piece 1 receives a section 13 of a shaft journal 12 of the steering gear train, not shown. Section 13 of the shaft journal 12 is bounded by three sides 14 disposed at right angles to one another and with a rounded or arched side 15 with approximately the same rounded configuration as the bight section 5. Side 14 opposite the rounded side 15 has an indentation or recess 28, which together with the clamping bolt 8 mechanically secure the shaft journal 12 in place.

Figure 2:
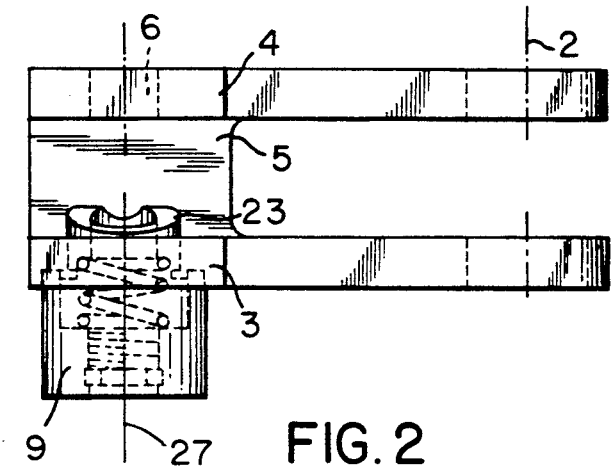
FIG. 2 is a bottom view of the coupling piece.
Figure 3:
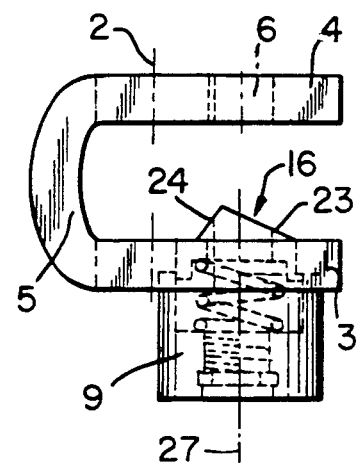
FIG. 3 is an end view of the device taken in the direction of the arrow A shown in FIG. 1.
Figure 4:
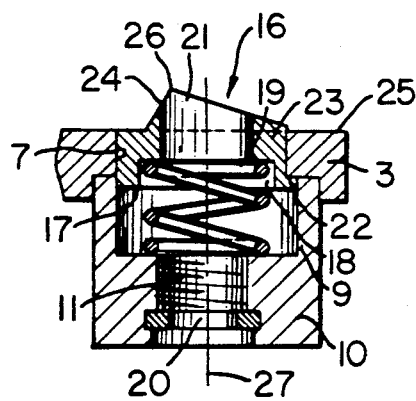
FIG. 4 is a sectional view taken along the line IV—IV in FIG. 1 and shown on an enlarged scale as compared to FIGS. 2 and 3.
Figure 5:
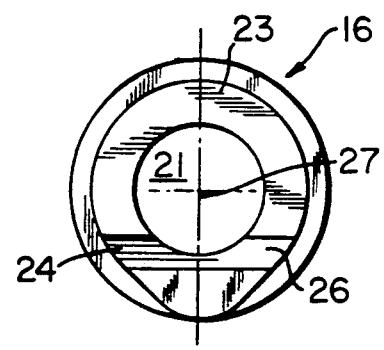
FIG. 5 is a top view of the lock bolt.

Coupling piece 1 is shown in FIGS. 2 and 3 in two views at right angles to one another, and FIG. 4 is an axially extending sectional view through bushing 9 taken along the line IV—IV in FIG. 1. Further, FIG. 4 is shown on an enlarged scale as compared to FIGS. 2 and 3 and the bore 7 through the side 3 is visible. Bore 7 has a circumferential periphery deviating in part from a circular shape with lock bolt 16 having a similar circumferential peripheral shape as can be seen in FIG. 5. This peripheral shape of the lock bolt 16 mating with the circumferential peripheral shape of the bore 7 retains the lock bolt in the bore so that it is non-rotatable, however, it is axially displaceable. On the outer side of the lock bolt 16 facing into an open space 17 within the bushing 9 there is an annular recess 18 in which one end of a helical spring 19 is located. The helical spring 19 is located within the open space 17 and its opposite end from the lock bolt bears against the inner surface of base 10 of the bushing 9. The base 10 has an axially extending bore 11 coaxial with the bores 6, 7 for receiving the threaded end of the clamping bolt 8. A circlip 20 is located at the outer end of the threaded bore 11.

Lock bolt 16 has an axially extending bore 21 coaxial with the bores 7, 11. Bore 21 is slightly larger than the outside diameter of the thread of the clamping bolt 8. Bushing 9 can be welded to the outer face of the side 3 or it can be pressed into the side. The lock bolt 16 is shaped to provide a shoulder acting as a stop 22 limiting the movement of the lock bolt inwardly of the side 3. The helical spring 19, the axially extending bore 21 and the threaded bore 11 are coaxial and are dimensioned so that the helical spring 19 is prestressed in the position of the lock bolt shown in FIG. 4.

Transversely of the axis 27, note FIGS. 2, 3 and 4, the lock bolt 16 has an inner end surface facing the opposite side 4 and an outer end surface facing outwardly of the connecting piece 1. The inner end surface is wedge-shaped formed by two bevel sections 23, 24. As can be seen in FIG. 3, the bevel sections 23 and 24 extend transversely of the axis 27. Note in FIG. 3 that first bevel section 23 extends from a first point more remote from the bight section 5 inclined from an inner first side surface 25 of the side 3 toward the other side 4 while the second bevel section 24 extends from a point closer to the bight section 5 from the first side surface of the side 3 toward the other side 4. This arrangement of the bevel sections 23, 24 of the lock bolt are effective when the stop 22 of lock bolt 16 bears against the side 3, note FIG. 4, with the bevel sections 23, 24 extending inwardly from the first side surface 25 of the side 3. The angle of inclination of the second bevel section 24 is considerably larger than the angle of inclination of the first bevel section 23 with reference to the plane of the first side surface 25 of the side 3. As can be noted in FIGS. 4 and 5 the first and second bevel sections intersect along a intersection line 26 extending parallel to the first direction of the connecting piece 1, note arrow A in FIG. 1. With respect to the axial bore 21 in the lock bolt 16 the intersection line 26 forms a chord relative to the axis 27 of the bore 21 or intersects the bore 21, note FIG. 5.

The chord or intersection line 26 is located between the axis 27 and the bight section 5. The normal distance of the chord or intersection line 26 from the central axis 27 is larger than the normal distance of the intersection line from a tangential line at the circumference of the longitudinal bore parallel to the chord where the tangential line is closest to the bight section 5. The relationship of these normal dimensions can be reversed, however, it is essential that the intersection line 26 intersects the periphery of bore 21.

Figure 6:
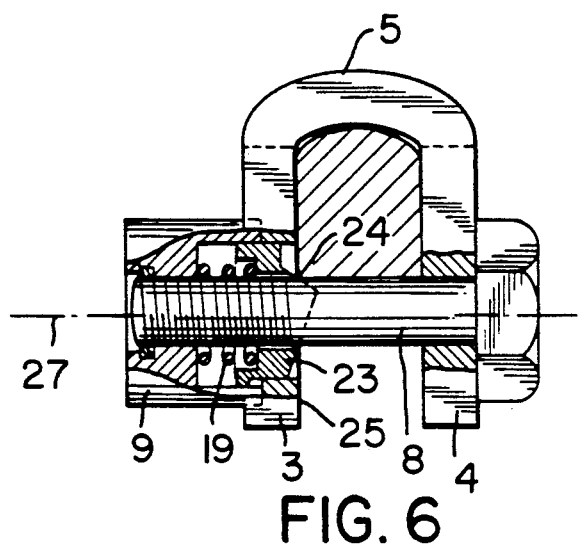
FIG. 6 is an end view, partly in section, of the coupling piece shown in FIG. 3, however, with the shaft journal of the steering gear train inserted into position.

It can be seen from FIG. 6 that the distance of the intersection line 26 of the first and second bevel sections 23, 24 from the bight section 5 of the coupling piece 1 is slightly greater than the height of the shaft journal 12 to be received by the coupling piece measured parallel to the central plane of the coupling piece as defined by the first direction identified by the arrow A.

This completes the description of the construction of the device.

Figure 7:
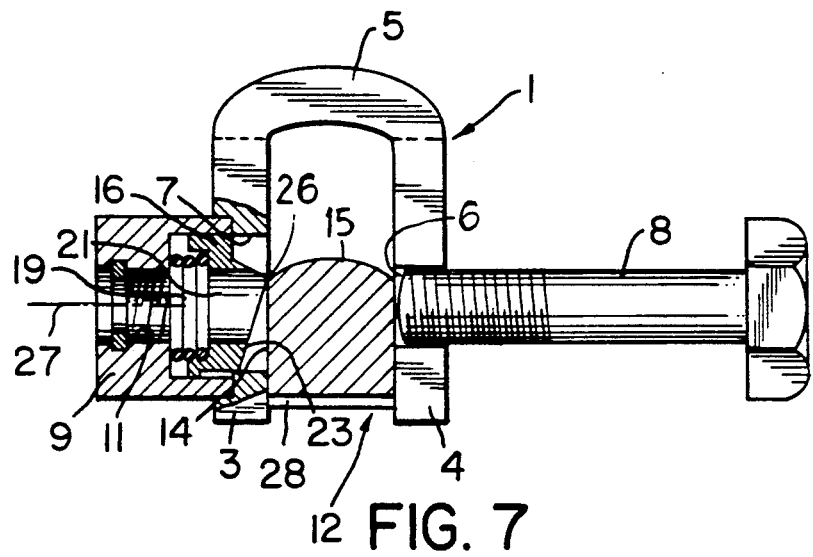
FIG. 7 is a sectional view similar to FIG. 6, however, illustrating the device during assembly and viewed in the same direction as in FIG. 6.

In the intended utilization of the device, the steering gear train together with the shaft journal 12 is rigidly mounted in a motor vehicle, as is the steering column, whereby the coupling piece 1 is pivoted towards the side about the axis 2, since the available space is very often limited, so that the coupling links can be added from the side. The device of the present invention is conceived so that it can be assembled using only one hand. Given the space conditions described above, the coupling piece 1 is subsequently pivoted inwardly, whereby the section 13 of the shaft journal 12 becomes positioned between the sides 3 and 4, as shown diagrammatically in FIG. 7, with the section 13 pressing the lock bolt outwardly against the force of the spring 19 until the section 13 has completely passed beyond the lock bolt as shown in FIG. 6, at which point the lock bolt 16 is pressed inwardly of the first side surface 25 of the side 3 by the spring 19. In this position, the second bevel section 24 pressing against the side face of the section 13 and assures that the section 13 is reliably pressed against the bight section 5. Next the clamping bolt 8 is inserted first through side 4 under the shaft journal 12 until it passes through the lock bolt 16 and is threaded into the threaded bore 11 in the base 10 of the bushing 9. The clamping bolt 8 is tightened within the threaded bore 11. The clamping bolt 8 can be inserted only if the section 13 of the shaft journal 12 has reached the position shown in FIG. 6, otherwise the clamping bolt can not be fully inserted because of the arrangement of the first and second bevel sections 23, 24 and because of the position of the intersection line 26 with respect to the cross-section of the bore 21, since the section 13 of the shaft journal would be in a blocking position. If the section 13 of the shaft journal does not assume the desired position for its assembly, that is, that it contacts the intersection line 26 with its lower side, then subsequently it is pressed into the predetermined when the bolt is inserted and tightened.

All of these assembly operations can be performed with only one hand, even in spite of the very limited space conditions. Due to the arrangement of the inventive device, the spring 19 is retained so that practically it is non-displaceable, and further the clamping bolt can be inserted only if the section 13 of the shaft journal 12 has in fact assumed its intended position, whereby the connection can not only be assembled and finished with one hand as per instructions, but the assembly can be performed without having the different parts in sight. In view of these conditions, the assembly can even be automated. Due to the invention it is assured in all cases, after the assembly of the parts and the installation on the bolt 8, the shafts or their axes are located so as to be aligned with respect to one another.

Figure 8:
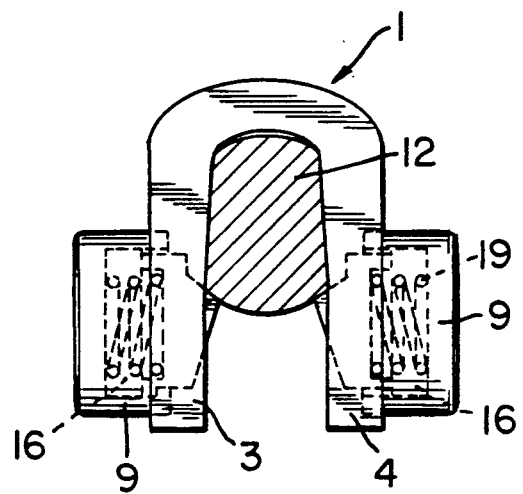
FIG. 8 is a sectional view similar to FIG. 3, however, of another embodiment having an additional lock bolt and with the shaft journal inserted for automated assembly.

Automated assembly is possible, particularly if the device is arranged as shown in FIG. 8. In this embodiment, the coupling piece is U-shaped in cross-section and has a spring loaded lock bolt 16 in each of its sides 3 and 4 arranged generally in the same manner as in the previous embodiment. In this arrangement, however, the lock bolts 16 have a solid cross-section, since in this embodiment a clamping bolt is unnecessary. As distinguished from the U-shaped construction of the coupling piece 1 in FIG. 3, in FIG. 8 the inside surfaces of the sides 3 and 4 as well as the corresponding sides of the shaft journal 12 have a wedge-shaped configuration, that is, the sides 3 and 4 converge inwardly toward one another in the direction toward the bight section 5. As a result, the cooperating parts of the device connected to one another have to be accurately machined and manufactured. If the shaft journal 12 is pressed into the coupling piece 1 with the illustrated U-shaped cross-section, then the two lock bolts 16 are pressed outwardly against the biasing action of the springs 19. As soon as the lower side of the shaft journal 12 has passed beyond the intersection line 26 on the inner end surface of the lock bolt 16, the springs 19 press the lock bolts inwardly and due to the bevel 24 holds the shaft journal in the illustrated position and retain it in this position. The angle of inclination of the bevel surface 24 is dimension to be so large that the bevel surface acts in a non-reversible or self locking manner so that the shaft journal can no longer move relative to the U-shaped coupling piece. As a result, the assembly can be completely automated.

While specific embodiments of the invention have been shown and described in detail to illustrate the application of the inventive principles, it will be understood that the invention may be embodied otherwise without departing from such principles.

We claim:

1. A device for connecting a motor vehicle steering column to a shaft journal (12) of a steering gear train, wherein the device comprises a coupling piece (1) having a first direction (A) with the coupling piece being U-shaped transversely of the first direction, said coupling piece (1) arranged to be articulated to the steering column for pivotal movement about an axis (2) extending transversely of the first direction, said U-shaped coupling piece (1) having a pair of laterally spaced sides (3, 4) and a bight section (5) extending between and interconnecting said sides, a bore (7) in at least one of said sides, a lock bolt (16) secured against turning in said bore, said sides (3, 4) each have a first side surface facing one another and a second side surface facing in the opposite direction, a stop formed in said lock bolt and arranged to contact the second side surface of the one of said sides (3), a spring (19) pressing said stop (22) of said lock bolt (16) against said second side surface, said lock bolt has a first end surface facing the other one of said sides and a second end surface facing in the opposite direction, and said first end surface (23, 24) of said lock bolt (16) has an axis extending in a second direction transversely of the first direction with said axis traversing said first end surface (23, 24) from a first point to a diagonally opposite second point on an outer circumferential periphery of said first end surface of said lock bolt with the first point being more remote from said bight section than said second point, said first end surface (23, 24) has a wedge-shaped configuration extending in the second direction and when said stop of said lock bolt is pressed against the one of said sides said wedge-shaped first end surface has a first bevel section inclined from the first point inwardly from the one of said sides in the second direction toward said bight section, wherein the improvement comprising that said wedge-shaped first end surface has a second bevel section inclined from the second point inwardly of the one of said sides in the second direction away from said bight section, and said first and second bevel sections (23, 24) each having an angle of inclination relative to the first side surface of said one of said sides and the angle of inclination of said second bevel section being greater than the angle of inclination of said first bevel section.

2. Device, as set forth in claim 1, wherein one said lock bolt is positioned in each of said sides in symmetrical and aligned positions relative to one another.

3. Device, as set forth in claim 1, wherein a bushing (9) is secured to said second side surface of said one of said sides and covers said bore (7) in which said lock bolt (16) is located, said spring (19) is located in said bushing (9) and said spring is an axially extending helical spring abutting at one end at a base (10) of said bushing (9) and at the opposite end on the second end surface of said lock bolt (16).

4. Device, as set forth in claim 2, wherein a bushing (9) is secured to said second side surface of each of said sides and covers said bore (7) in which said lock bolt (16) is located, and one said spring (19) is located in each said bushing (9) and said spring is an axially extending helical spring abutting at one end at a base (10) of said bushing (9) and at the opposite end on the second end surface of said lock bolt (16).

5. Device, as set forth in claim 1, wherein a bore (6) is located in the other said side (4) aligned with the bore (7) containing said lock bolt (16), a bushing (9) secured to the one of said sides (4) and aligned with said bore (7) in which said lock bolt (16) is supported, a threaded bore (11) located within said bushing aligned with said bore (6) in the other one of said sides (4), a clamping bolt (8) is arranged to pass through said bore (6) in the other one of said sides (4) and extend through said lock bolt (16) into said threaded bore (11) in said bushing (9), and said lock bolt has a bore (21) in axial alignment with said bores, (6 and 7) in said sides with the diameter of said bore (21) being at least as great as an external diameter of the threaded bore (11) in said bushing (9).

6. Device, as set forth in claim 1, wherein said first and second bevel sections meet at an intersection line (26) extending generally parallel to the first direction with said intersection line forming a chord of a bore (21) extending through said lock bolt (16).

7. Device, as set forth in claim 2, wherein said first and second bevel sections meet at an intersection line (26) extending generally parallel to the first direction with said intersection line forming a chord of a bore extending through said lock bolt (16).

8. Device, as set forth in claim 6, wherein the bore (21) of said lock bolt (16) has a central axis (27) intersecting the second direction of said wedge-shaped first end surface and the intersection line (26) forms a chord of the lock bolt bore (21) with said chord spaced between the central axis (27) and the bight section (5) of said coupling piece (1).

9. Device, as set forth in claim 7, wherein the bore (21) of said lock bolt (16) has a central axis (27) intersecting the second direction of said wedge-shaped first end surface and the intersection line (26) forms a chord of the lock bolt bore (21) with said chord spaced between the central axis (27) and the bight section (5) of said coupling piece.

10. Device, as set forth in claim 8, wherein the normal distance of the intersection line (26) from the central axis (27) is larger than the normal distance of said intersection line (26) from a tangential plane to the second point on the outer circumferential periphery of said lock bolt.

11. Device, as set forth in claim 9, wherein the normal distance of the intersection line (26) from the central axis (27) is larger than the normal distance of said intersection line (26) from a tangential plane to the second point on the outer circumferential periphery of said lock bolt.

12. Device, as set forth in claim 10, wherein the spacing of the intersection line (26) of the first and second bevel sections (23, 24) from said bight section (5) is slightly greater than the corresponding dimension of said shaft journal (12) to be received in said coupling piece (1) with the dimension being measured parallel to the second direction.

13. Device, as set forth in claim 11, wherein the normal distance of the intersection line (26) from the central axis (27) is larger than the normal distance of said intersection line (26) from a tangential plane to the second point on the outer circumferential periphery of said lock bolt.

14. Device, as set forth in claim 5, wherein a circlip (20) is located in said threaded bore (11) at the end of said threaded bore more remote from said side (3) and said circlip (20) receives the end of said clamping bolt (8).

15. Device, as set forth in claim 2, wherein said first side surfaces of said sides (3, 4) and corresponding side surfaces of said shaft journal (12) are inclined inwardly toward one another from said lock bolt toward said bight section (5).

* * * * *

UNITED STATES PATENT AND TRADEMARK OFFICE
CERTIFICATE OF CORRECTION

PATENT NO. : 5,090,833

DATED : 25 February 1992

INVENTOR(S) : Max Oertle, et al.

It is certified that error appears in the above-identified patent and that said Letters Patent is hereby corrected as shown below:

On the title page: Item

(73) Assignee : Etablissement Supervis,
Furstentum, LIECHTENSTEIN

Signed and Sealed this

Thirteenth Day of July, 1993

Attest:

MICHAEL K. KIRK

Attesting Officer

Acting Commissioner of Patents and Trademarks